(12) United States Patent
Lohr et al.

(10) Patent No.: US 8,751,893 B2
(45) Date of Patent: *Jun. 10, 2014

(54) SYNCHRONOUS HYBRID AUTOMATIC REPEAT REQUEST (HARQ) PROTOCOL EMPLOYING A FIRST INFORMATION ELEMENT INDICATING WHETHER TO PERFORM RETRANSMISSION OF AN UPLINK DATA PACKET AND A SECOND INFORMATION ELEMENT INDICATES MODULATION AND CODING SCHEME (MCS) FOR THE RETRANSMISSION

(71) Applicant: Optis Wireless Technology, LLC, Plano, TX (US)

(72) Inventors: Joachim Lohr, Darmstadt (DE); Eiko Seidel, Darmstadt (DE); Dieter Petermann, Darmstadt (DE)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/849,082

(22) Filed: Mar. 22, 2013

(65) Prior Publication Data

US 2013/0215830 A1 Aug. 22, 2013

Related U.S. Application Data

(63) Continuation of application No. 13/154,163, filed on Jun. 6, 2011, now Pat. No. 8,429,481, and a continuation of application No. 12/835,696, filed on Jul. 13, 2010, now Pat. No. 7,979,770, and a continuation of application No. 10/594,496, filed on Aug. 7, 2007, now Pat. No. 7,783,949, which is a continuation of application No. PCT/EP2005/002561, filed on Mar. 10, 2005.

(30) Foreign Application Priority Data

Apr. 1, 2004 (EP) .................................... 04008017

(51) Int. Cl.
*H03M 13/00* (2006.01)

(52) U.S. Cl.
USPC ............................................ 714/751; 370/329

(58) Field of Classification Search
USPC .......................................... 714/748, 750, 751
See application file for complete search history.

(56) References Cited

U.S. PATENT DOCUMENTS 6,697,988 B2 * 2/2004 Kim et al. .................... 714/752
6,901,063 B2    5/2005 Vayanos (Continued)

FOREIGN PATENT DOCUMENTS

EP    1 244 240      9/2002
EP    1 274 204      1/2003

(Continued)

OTHER PUBLICATIONS

Japanese Notice of Reason for Rejection dated Jun. 4, 2013 with English Translation.

(Continued)

*Primary Examiner* — Esaw Abraham
(74) *Attorney, Agent, or Firm* — Dickinson Wright PLLC

(57) ABSTRACT

A base station receives an uplink data packet from a user equipment based on a synchronous hybrid automatic repeat request (HARQ) protocol, and transmits a first information element and a second information element in parallel to the user equipment. The first information element indicates whether to perform a retransmission of the uplink data packet, and the second information element indicates modulation and coding scheme (MCS) for the retransmission. The base station receives the retransmission from the user equipment according to the modulation and coding scheme. The first information element is for example an ACK/NACK feedback message.

4 Claims, 11 Drawing Sheets

(56) References Cited

U.S. PATENT DOCUMENTS

| | | | |
|---|---|---|---|
| 6,939,659 B2* | 9/2005 | Naiini et al. | 430/190 |
| 7,185,256 B2 | 2/2007 | Miki | |
| 7,310,336 B2* | 12/2007 | Malkamaki | 370/392 |
| 7,343,172 B2 | 3/2008 | Hwang | |
| 7,359,345 B2* | 4/2008 | Chang et al. | 370/322 |
| 7,561,550 B2* | 7/2009 | Kwak et al. | 370/331 |
| 7,594,153 B2* | 9/2009 | Kim et al. | 714/751 |
| 7,817,605 B2* | 10/2010 | Liu | 370/337 |
| 7,907,570 B2* | 3/2011 | Hwang | 455/522 |
| 2002/0019965 A1 | 2/2002 | Bims | |
| 2002/0046379 A1 | 4/2002 | Miki | |
| 2002/0071407 A1 | 6/2002 | Koo | |
| 2002/0168945 A1 | 11/2002 | Hwang | |
| 2003/0072266 A1 | 4/2003 | Uesugi | |
| 2003/0088822 A1 | 5/2003 | Kim | |
| 2003/0097629 A1 | 5/2003 | Moon | |
| 2003/0119452 A1* | 6/2003 | Kim et al. | 455/69 |
| 2003/0152062 A1 | 8/2003 | Terry | |
| 2003/0235160 A1 | 12/2003 | Saifuddin | |
| 2004/0022218 A1* | 2/2004 | Kim et al. | 370/335 |
| 2005/0013263 A1* | 1/2005 | Kim et al. | 370/320 |
| 2012/0002603 A1 | 1/2012 | Lohr | |

FOREIGN PATENT DOCUMENTS

| | | |
|---|---|---|
| EP | 1 289 179 | 3/2003 |
| EP | 1 401 140 | 3/2004 |
| JP | 2002-51003 | 2/2002 |
| JP | 2003-229813 | 8/2003 |
| JP | 4700049 | 3/2011 |
| WO | 02/089389 | 11/2002 |
| WO | 2004-017557 | 2/2004 |

OTHER PUBLICATIONS

PCT International Search Report dated Aug. 29, 2005.
European Office Action dated May 2, 2008.
Japanese Notice of Reason for Rejection dated Oct. 5, 2010 with English Translation.
3GPP TSG RAN WG1 Ad Hoc Meeting, "Node b scheduling of HARQ retransmission," LG Electronics, R1-040022, Jan. 2004, pp. 1-5.
English translation of Japanese Office Action dated May 29, 2012.
3GPPRAN1#32, "Overview of the Enhanced Uplink Proposal," Motorola, Tdoc# R1-03-0476, May 19-23, 2003, pp. 1-7.
Japanese Notice of Reasons for Rejection dated May 14, 2013 with English Translation.

* cited by examiner

SYNCHRONOUS HYBRID AUTOMATIC REPEAT REQUEST (HARQ) PROTOCOL EMPLOYING A FIRST INFORMATION ELEMENT INDICATING WHETHER TO PERFORM RETRANSMISSION OF AN UPLINK DATA PACKET AND A SECOND INFORMATION ELEMENT INDICATES MODULATION AND CODING SCHEME (MCS) FOR THE RETRANSMISSION

CROSS-REFERENCE TO RELATED APPLICATIONS

This is a continuation application of application Ser. No. 13/154,163 (now U.S. Pat. No. 8,429,481) filed Jun. 6, 2011, which is a continuation of Ser. No. 12/835,696 (now U.S. Pat. No. 7,979,770) filed Jul. 13, 2010, which is a continuation application of application Ser. No. 10/594,496 (now U.S. Pat. No. 7,783,949) filed Sep. 28, 2006, which is a national stage of PCT/EP2005/002561 filed Mar. 10, 2005, which is based on European Application No. 04008017.8 filed Apr. 1, 2004, the entire contents of each which are incorporated by reference herein.

FIELD OF THE INVENTION

The present invention relates to a method for controlling the amount of information in retransmission data packets transmitted from a transmitting entity to a receiving entity via at least one data channel using a hybrid automatic repeat request protocol. Further, the present invention provides a receiving entity and a transmission entity both adapted to perform the respective method steps. Moreover, a communication system is provided which comprises at least one receiving entity and at least one receiving entity.

TECHNICAL BACKGROUND

W-CDMA (Wideband Code Division Multiple Access) is a radio interface for IMT-2000 (International Mobile Communication), which was standardized for use as the $3^{rd}$ generation wireless mobile telecommunication system. It provides a variety of services such as voice services and multimedia mobile communication services in a flexible and efficient way. The standardization bodies in Japan, Europe, USA, and other countries have jointly organized a project called the $3^{rd}$ Generation Partnership Project (3GPP) to produce common radio interface specifications for W-CDMA.

The standardized European version of IMT-2000 is commonly called UMTS (Universal Mobile Telecommunication System). The first release of the specification of UMTS has been published in 1999 (Release 99). In the mean time several improvements to the standard have been standardized by the 3GPP in Release 4 and Release 5 and discussion on further improvements is ongoing under the scope of Release 6.

The dedicated channel (DCH) for downlink and uplink and the downlink shared channel (DSCH) have been defined in Release 99 and Release 4. In the following years, the developers recognized that for providing multimedia services—or data services in general—high speed asymmetric access had to be implemented. In Release 5 the high-speed downlink packet access (HSDPA) was introduced. The new high-speed downlink shared channel (HS-DSCH) provides downlink high-speed access to the user from the UMTS Radio Access Network (RAN) to the communication terminals, called user equipments in the UMTS specifications.

Hybrid ARQ Schemes

The most common technique for error detection of non-real time services is based on Automatic Repeat reQuest (ARQ) schemes, which are combined with Forward Error Correction (FEC), called Hybrid ARQ. If Cyclic Redundancy Check (CRC) detects an error, the receiver requests the transmitter to send additional bits or a new data packet. From different existing schemes the stop-and-wait (SAW) and selective-repeat (SR) continuous ARQ are most often used in mobile communication.

A data unit will be encoded before transmission. Depending on the bits that are retransmitted three various types of ARQ may be defined.

In HARQ Type I the erroneous data packets received, also called PDUs (Packet Data Unit) are discarded and new copy of that PDU is retransmitted and decoded separately. There is no combining of earlier and later versions of that PDU. Using HARQ Type II the erroneous PDU that needs to be retransmitted is not discarded, but is combined with some incremental redundancy bits provided by the transmitter for subsequent decoding. Retransmitted PDU sometimes have higher coding rates and are combined at the receiver with the stored values. That means that only little redundancy is added in each retransmission.

Finally, HARQ Type III is almost the same packet retransmission scheme as Type II and only differs in that every retransmitted PDU is self-decodable. This implies that the PDU is decodable without the combination with previous PDUs. In case some PDUs are heavily damaged such that almost no information is reusable self decodable packets can be advantageously used.

When employing chase-combining the retransmission packets carry identical symbols. In this case the multiple received packets are combined either by a symbol-by-symbol or by a bit-by-bit basis (see D. Chase: "Code combining: A maximum-likelihood decoding approach for combining an arbitrary number of noisy packets", IEEE Transactions on Communications, Col. COM-33, pages 385 to 393, May 1985, incorporated herein by reference). These combined values are stored in the soft buffers of respective HARQ processes.

Packet Scheduling

Packet scheduling may be a radio resource management algorithm used for allocating transmission opportunities and transmission formats to the users admitted to a shared medium. Scheduling may be used in packet based mobile radio networks in combination with adaptive modulation and coding to maximize throughput/capacity by e.g. allocating transmission opportunities to the users in favorable channel conditions. The packet data service in UMTS may be applicable for the interactive and background traffic classes, though it may also be used for streaming services. Traffic belonging to the interactive and background classes is treated as non real time (NRT) traffic and is controlled by the packet scheduler. The packet scheduling methodologies can be characterized by:

Scheduling period/frequency: The period over which users are scheduled ahead in time.

Serve order: The order in which users are served, e.g. random order (round robin) or according to channel quality (C/I or throughput based).

Allocation method: The criterion for allocating resources, e.g. same data amount or same power/code/time resources for all queued users per allocation interval.

The packet scheduler for uplink is distributed between Radio Network Controller (RNC) and user equipment in 3GPP UMTS R99/R4/R5. On the uplink, the air interface resource to be shared by various users is the total received power at a Node B, and consequently the task of the scheduler is to allocate the power among the user equipment(s). In current UMTS R99/R4/R5 specifications the RNC controls the maximum rate/power a user equipment is allowed to transmit during uplink transmission by allocating a set of various transport formats (modulation scheme, code rate, etc.) to each user equipment.

The establishment and reconfiguration of such a TFCS (transport format combination set) may be accomplished using Radio Resource Control (RRC) messaging between RNC and user equipment. The user equipment is allowed to autonomously choose among the allocated transport format combinations based on its own status e.g. available power and buffer status. In current UMTS R99/R4/R5 specifications there is no control on time imposed on the uplink user equipment transmissions. The scheduler may e.g. operate on transmission time interval basis.

UMTS Architecture

The high level R99/4/5 architecture of Universal. Mobile Telecommunication System (UMTS) is shown in FIG. 1 (see 3GPP TR 25.401: "UTRAN Overall Description", incorporated herein by reference). The network elements are functionally grouped into the Core Network (CN) 101, the UMTS Terrestrial Radio Access Network (UTRAN) 102 and the User Equipment (UE) 103. The UTRAN 102 is responsible for handling all radio-related functionality, while the CN 101 is responsible for routing calls and data connections to external networks. The interconnections of these network elements are defined by open interfaces (Iu, Uu). It should be noted that UMTS system is modular and it is therefore possible to have several network elements of the same type.

FIG. 2 illustrates the current architecture of UTRAN. A number of Radio Network Controllers (RNCs) 201, 202 are connected to the CN 101. Each RNC 201, 202 controls one or several base stations (Node Bs) 203, 204, 205, 206, which in turn communicate with the user equipments. An RNC controlling several base stations is called Controlling RNC (C-RNC) for these base stations. A set of controlled base stations accompanied by their C-RNC is referred to as Radio Network Subsystem (RNS) 207, 208. For each connection between User Equipment and the UTRAN, one RNS is the Serving RNS (S-RNS). It maintains the so-called Iu connection with the Core Network (CN) 101. When required, the Drift RNS 302 (D-RNS) 302 supports the Serving RNS (S-RNS) 301 by providing radio resources as shown in FIG. 3. Respective RNCs are called Serving RNC (S-RNC) and Drift RNC (D-RNC). It is also possible and often the case that C-RNC and D-RNC are identical and therefore abbreviations S-RNC or RNC are used.

Enhanced Uplink Dedicated Channel (E-DCH)

Uplink enhancements for Dedicated Transport Channels (DTCH) are currently studied by the 3GPP Technical. Specification Group RAN (see 3GPP TR 25.896: "Feasibility Study for Enhanced Uplink for UTRA FDD (Release 6)", incorporated herein by reference). Since the use of IP-based services become more important, there is an increasing demand to improve the coverage and throughput of the RAN as well as to reduce the delay of the uplink dedicated transport channels. Streaming, interactive and background services could benefit from this enhanced uplink.

One enhancement is the usage of adaptive modulation and coding schemes (AMC) in connection with Node B controlled scheduling, thus an enhancement of the Uu interface. In the existing R99/R4/R5 system the uplink maximum data rate control resides in the RNC. By relocating the scheduler in the Node B the latency introduced due to signaling on the interface between RNC and Node B may be reduced and thus the scheduler may be able to respond faster to temporal changes in the uplink load. This may reduce the overall latency in communications of the user equipment with the RAN. Therefore Node B controlled scheduling is capable of better controlling the uplink interference and smoothing the noise rise variance by allocating higher data rates quickly when the uplink load decreases and respectively by restricting the uplink data rates when the uplink load increases. The coverage and cell throughput may be improved by a better control of the uplink interference.

Another technique, which may be considered to reduce the delay on the uplink, is introducing a shorter TTI (Transmission Time Interval) length for the E-DCH compared to other transport channels. A transmission time interval length of 2 ms is currently investigated for use on the E-DCH, while a transmission time interval of 10 ms is commonly used on the other channels. Hybrid ARQ, which was one of the key technologies in HSDPA, is also considered for the enhanced uplink dedicated channel. The Hybrid ARQ protocol between a Node B and a user equipment allows for rapid retransmissions of erroneously received data units, and may thus reduce the number of RLC (Radio Link Control) retransmissions and the associated delays. This may improve the quality of service experienced by the end user.

To support enhancements described above, a new MAC sub-layer is introduced which will be called MAC-eu in the following (see 3GPP TSG RAN WG1, meeting 431, Tdoc R01-030284, "Scheduled and Autonomous Mode Operation for the Enhanced Uplink"). The entities of this new sub-layer, which will be described in more detail in the following sections, may be located in user equipment and Node B. On user equipment side, the MAC-eu performs the new task of multiplexing upper layer data (e.g. MAC-d) data into the new enhanced transport channels and operating HARQ protocol transmitting entities.

E-DCH MAC Architecture at the User Equipment

FIG. 4 shows the exemplary overall E-DCH MAC architecture on user equipment side. A new MAC functional entity, the MAC-eu 503, is added to the MAC architecture of Rel/99/4/5. The E-DCH MAC architecture includes RLC and higher layer entities 501, a MAC-d entity 502, the new functional entity MAC-eu 503, and the Physical Layer 504. The MAC-eu 503 entity is depicted in more detail in FIG. 5.

There are M various data flows (MAC-d) carrying data packets to be transmitted from user equipment to Node B. These data flows can have different QoS (Quality of Service), e.g. delay and error requirements, and may require different configurations of HARQ instances. Therefore the data packets can be stored in different Priority Queues. The set of HARQ transmitting and receiving entities, located in user equipment and Node B respectively will be referred to as HARQ process. The scheduler will consider QoS parameters in allocating HARQ processes to different priority queues. MAC-eu entity receives scheduling information from Node B (network side) via Layer 1 signaling.

E-DCH MAC Architecture at the UTRAN

In soft handover operation the MAC-eu entities in the E-DCH MAC Architecture at the UTRAN side may be distributed across Node B (MAC-eub) and S-RNC (MAC-eur). The scheduler in Node B chooses the active users and performs rate control by determining and signaling a commanded rate, suggested rate or TFC (Transport Format Combination) threshold that limits the active user (UE) to a subset of the TCFS (Transport Format Combination Set) allowed for transmission.

Every MAC-eu entity corresponds to a user (UE). In FIG. 6 the Node B MAC-eu architecture is depicted in more detail. It can be noted that each HARQ Receiver entity is assigned certain amount or area of the soft buffer memory for combining the bits of the packets from outstanding retransmissions. Once a packet is received successfully, it is forwarded to the reordering buffer providing the in-sequence delivery to upper layer. According to the depicted implementation, the reordering buffer resides in S-RNC during soft handover (see 3GPP TSG RAN WG 1, meeting #31: "HARQ Structure", Tdoc R1-030247, incorporated herein by reference). In FIG. 7 the S-RNC MAC-eu architecture which comprises the reordering buffer of the corresponding user (UE) is shown. The number of reordering buffers is equal to the number of data flows in the corresponding MAC-eu entity on user equipment side. Data and control information is sent from all Node Bs within Active Set to S-RNC during soft handover.

It should be noted that the required soft buffer size depends on the used HARQ scheme, e.g. an HARQ scheme using incremental redundancy (IR) requires more soft buffer than one with chase combining (CC).

E-DCH Signaling

E-DCH associated control signaling required for the operation of a particular scheme consists of uplink and downlink signaling. The signaling depends on uplink enhancements being considered.

In order to enable Node B controlled scheduling (e.g. Node B controlled time and rate scheduling), user equipment has to send some request message on the uplink for transmitting data to the Node B. The request message may contain status information of a user equipment e.g. buffer status, power status, channel quality estimate. The request message is in the following referred to as Scheduling Information (SI). Based on this information a Node B can estimate the noise rise and schedule the UE. With a grant message sent in the downlink from the Node B to the UE, the Node B assigns the UE the TFCS with maximum data rate and the time interval, the UE is allowed to send. The grant message is in the following referred to as Scheduling Assignment (SA).

In the uplink user equipment has to signal Node B with a rate indicator message information that is necessary to decode the transmitted packets correctly, e.g. transport block size (TBS), modulation and coding scheme (MCS) level, etc. Furthermore, in case HARQ is used, the user equipment has to signal HARQ related control information (e.g. Hybrid ARQ process number, HARQ sequence number referred to as New Data Indicator (NDI) for UMTS Rel. 5, Redundancy version (RV), Rate matching parameters etc.)

After reception and decoding of transmitted packets on enhanced uplink dedicated channel (E-DCH) the Node B has to inform the user equipment if transmission was successful by respectively sending ACK/NAK in the downlink.

Mobility Management within R99/4/5 UTRAN

In this section some frequently used terms will be briefly defined and some procedures connected to mobility management will be outlined (see 3GPP TR 21.905: "Vocabulary for 3GPP Specifications", incorporated herein by reference).

A radio link may be a logical association between single UE and a single UTRAN access point. Its physical realization comprises radio bearer transmissions.

A handover may be defined as transfer of a user's connection from one radio bearer to another. In contrast, during "soft handover" (SHO) radio links are established and abandoned such that the UE always keeps at least one radio link to the UTRAN. Soft handover is specific for networks employing Code Division Multiple Access (CDMA) technology. Handover execution is commonly controlled by S-RNC in mobile radio network.

The "active set" comprises a set of radio links simultaneously involved in a specific communication service between UE and radio network, e.g. during soft handover, the UE's active set comprises all radio links to the RAN's Node Bs serving the UE.

An Active set update procedure modifies the active set of the communication between UE and UTRAN. The procedure comprises three functions: radio link addition, radio link removal and combined radio link addition and removal. The maximum number of simultaneous radio links is set to eight. New radio links may be added to the active set once the pilot signal strengths of respective base stations exceed certain threshold relative to the pilot signal of the strongest member within active set. A radio link may be removed from the active set once the pilot signal strength of the respective base station exceeds certain threshold relative to the strongest member of the active set. The threshold for radio link addition is typically chosen to be higher than that for the radio link deletion. Hence, addition and removal events form a hysteresis with respect to pilot signal strengths. Pilot signal measurements are reported to the network (S-RNC) from the UE by means of RRC signaling. Before sending measurement results, some filtering my be performed to average out the fast fading. A typical filtering duration may be about 200 ms and the duration contributes to handover delay. Based on measurement results, S-RNC may decide to trigger the execution of one of the functions of active set update procedure.

E-DCH—Node B Controlled Scheduling

Node B controlled scheduling is one of the technical features for E-DCH which is foreseen to enable more efficient use of the uplink power resource in order to provide a higher cell throughput in the uplink and to increase the coverage. The term "Node B controlled scheduling" denotes the possibility for the Node B to control, within the limits set by the RNC, the set of TFCs from which the UE may choose a suitable TFC. The set of TFCs from which the UE may choose autonomously a TFC is in the following referred to as "Node B controlled TFC subset". "Node B controlled TFC subset" is a subset of the TFCS configured by RNC as seen in FIG. 8. The UE selects a suitable TFC from the "Node B controlled TFC subset" employing the Rel5 TFC selection algorithm. Any TFC in the "Node B controlled TFC subset" might be selected by the UE, provided there is sufficient power margin, sufficient data available and TFC is not in the blocked state.

Two fundamental approaches to scheduling UE transmission for the E-DCH exist. The scheduling schemes can all be viewed as management of the TFC selection in the UE and mainly differs in how the Node B can influence this process and the associated signaling requirements.

Node B Controlled Rate Scheduling

The principle of this scheduling approach is to allow Node B to control and restrict the transport format combination selection of the user equipment by fast TFCS restriction control. A Node B may expand/reduce the "Node B controlled subset", which user equipment can choose autonomously on suitable transport format combination from, by Layer-1 signaling. In Node B controlled rate scheduling all uplink transmissions may occur in parallel but at a rate low enough such that the noise rise threshold at the Node B is not exceeded. Hence, transmissions from different user equipments may overlap in time. With Rate scheduling a Node B can only restrict the uplink TFCS but does not have any control of the time when UEs are transmitting data on the E-DCH. Due to Node B being unaware of the number of UEs transmitting at the same time no precise control of the uplink noise rise in the cell may be possible (see 3GPP TR 25.896: "Feasibility study for Enhanced Uplink for UTRA FDD (Release 6)", version 1.0.0, incorporated herein by reference).

Two new Layer-1 messages are introduced in order to enable the transport format combination control by Layer-1 signaling between the Node B and the user equipment. A Rate Request (RR) may be sent in the uplink by the user equipment to the Node B. With the RR the user equipment can request the Node B to expand/reduce the "Node controlled TFC Subset" by one step. Further, a Rate Grant (RG) may be sent in the downlink by the Node B to the user equipment. Using the RG, the Node B may change the "Node B controlled TFC Subset", e.g. by sending up/down commands. The new "Node B controlled TFC Subset" is valid until the next time it is updated.

Node B Controlled Rate and Time Scheduling

The basic principle of Node B controlled time and rate scheduling is to allow (theoretically only) a subset of the user equipments to transmit at a given time, such that the desired total noise rise at the Node B is not exceeded. Instead of sending up/down commands to expand/reduce the "Node B controlled TFC Subset" by one step, a Node B may update the transport format combination subset to any allowed value through explicit signaling, e.g. by sending a TFCS indicator (which could be a pointer).

Furthermore, a Node B may set the start time and the validity period a user equipment is allowed to transmit. Updates of the "Node B controlled TFC Subsets" for different user equipments may be coordinated by the scheduler in order to avoid transmissions from multiple user equipments overlapping in time to the extent possible. In the uplink of CDMA systems, simultaneous transmissions always interfere with each other. Therefore by controlling the number of user equipments, transmitting simultaneously data on the E-DCH, Node B may have more precise control of the uplink interference level in the cell. The Node B scheduler may decide which user equipments are allowed to transmit and the corresponding TFCS indicator on a per transmission time interval (TTI) basis based on, for example, buffer status of the user equipment, power status of the user equipment and available interference Rise over Thermal (RoT) margin at the Node B.

Two new Layer-1 messages axe introduced in order to support Node B controlled time and rate scheduling. A Scheduling Information Update (SI) may be sent in the uplink by the user equipment to the Node B. If user equipment finds a need for sending scheduling request to Node B (for example new data occurs in user equipment buffer), a user equipment may transmit required scheduling information. With this scheduling information the user equipment provides Node B information on its status, for example its buffer occupancy and available transmit power.

A Scheduling assignment (SA) may be transmitted in the downlink from a Node B to a user equipment. Upon receiving the scheduling request the Node B may schedule a user equipment based on the scheduling information (SI) and parameters like available RoT margin at the Node B. In the Scheduling Assignment (SA) the Node B may signal the TFCS indicator and subsequent transmission start time and validity period to be used by the user equipment.

Node B controlled time and rate scheduling provides a more precise RoT control compared to the rate-only controlled scheduling as already mentioned before. However this more precise control of the interference at this Node B is obtained at the cost of more signaling overhead, and scheduling delay (scheduling request and scheduling assignment messages) compared to rate control scheduling.

In FIG. 9 a general scheduling procedure with Node B controlled time and rate scheduling is shown. When a user equipment wants to be scheduled for transmission of data on E-DCH it first sends a scheduling request to Node B. $T_{prop}$ denotes here the propagation time on the air interface. The contents of this scheduling request are information (scheduling information) for example buffer status and power status of the user equipment. Upon receiving that scheduling request, the Node B may process the obtained information and determine the scheduling assignment. The scheduling will require the processing time $T_{schedule}$.

The scheduling assignment, which comprises the TFCS indicator and the corresponding transmission start time and validity period, may be then transmitted in the downlink to the user equipment. After receiving the scheduling assignment the user equipment will start transmission on E-DCH in the assigned transmission time interval.

The use of either rate scheduling or time and rate scheduling may be restricted by the available power as the E-DCH will have to co-exist with a mix of other transmissions by the user equipments in the uplink. The co-existence of the different scheduling modes may provide flexibility in serving different traffic types. For example, traffic with small amount of data and/or higher priority such as TCP ACK/NACK may be sent using only a rate control mode with autonomous transmissions compared to using time and rate-control scheduling. The former would involve lower latency and lower signaling overhead.

E-DCH—Hybrid ARQ

Node B controlled Hybrid ARQ may allow rapid retransmissions of erroneously received data packets. Fast retransmissions between a user equipment and a Node B may reduce the number of higher layer retransmissions and the associated delays, thus the quality perceived by the end user may be improved.

A protocol structure with multiple stop-and-wait (SAW) Hybrid ARQ processes can be used for E-DCH, similar to the scheme employed for the downlink HS-DSCH in HSDPA, but with appropriate modifications motivated by the differences between uplink and downlink (see 3GPP TR 25.896).

An N-channel SAW scheme consists of N parallel HARQ process, each process works as a stop-and-wait retransmission protocols, which corresponds to a selective repeat ARQ (SR) with window size 1. It is assumed that user equipment can only transmit data on a single HARQ process each transmission time interval.

In FIG. 10 an example N-channel SAW protocol with N=3 HARQ processes is illustrated. A user equipment is transmitting data packet 1 on E-DCH on the uplink to the Node B. The transmission is carried out on the first HARQ process. After propagation delay of the air interface $T_{prop}$ the Node B receives the packet and starts demodulating and decoding. Depending on whether the decoding was successful an ACK/NACK is sent in the downlink to the user equipment.

In this example Node B sends an ACK after $T_{NBprocess}$, which denotes the time required for decoding and processing the received packet in Node B, to the user equipment. Based on the feedback on the downlink the user equipment decides whether it resends the data packet or transmits a new data packet. The processing time available for the user equipment between receiving the ACKnowledgement and transmitting the next transmission time interval in the same HARQ process is denoted $T_{UEprocess}$.

In the example user equipment transmits data packet 4 upon receiving the ACK. The round trip time (RTT) denotes the time between transmission of a data packet in the uplink and sending a retransmission of that packet or a new data packet upon receiving the ACK/NACK feedback for that packet. To avoid idle periods due to lack of available HARQ processes, it is necessary that the number N of HARQ processes matches to the HARQ round trip time (RTT).

Considering known and unknown transmission timing, it may be distinguished between synchronous and asynchronous data transmission. A retransmission protocol with asynchronous data transmission uses an explicit signaling to identify a data block or the HARQ process, whereas in a protocol with synchronous data transmission, a data block or HARQ process is identified based on the point of time a data block is received.

A UE may for example have to signal the HARQ process number explicitly in a protocol with asynchronous data transmission in order to ensure correct soft combining of data packets in case of a retransmission. The advantage of a HARQ retransmission protocol with asynchronous data transmission is the flexibility, which is given to the system. The Node B scheduler may for example assign UEs a time period and HARQ processes for the transmission of data on the E-DCH based on the interference situation in the cell and further parameters like priority or QoS parameters of the corresponding E-DCH service.

A retransmission protocol with asynchronous HARQ feedback information uses sequence numbers (SN) or other explicit identification of the feedback messages whereas protocols with synchronous HARQ feedback information identifies the feedback messages based on the time when they are received, as for example in HSDPA. Feedback may be sent on the HS-DPCCH after a certain time instant upon having received the HS-DSCH (see 3GPP TR 25.848: "Physical Layer Aspects of High Speed Downlink Packet Access", version 5.0.0, incorporated herein by reference).

As mentioned before a retransmission protocol with asynchronous data transmission enables the Node B more scheduling flexibility. The scheduling assignment can for example be based on the scheduling information sent from UE and the interference situation in the cell. The different scheduling approaches considering retransmissions have to be taken into account, in order to enable further control of the uplink interference by the Node B scheduler.

A retransmission protocol with asynchronous uplink but synchronous retransmissions may be one approach, which allows the scheduler more control on the noise rise in the cell. The transmission of new data packets on E-DCH is sent in an asynchronous manner in order to keep the advantage of scheduling flexibility, though the retransmissions are sent after a predefined time instant upon having received the NACK. The advantages of a retransmission protocol with synchronous retransmissions may also depend on the scheduling mode used.

In the rate controlled scheduling mode Node B is only controlling the TFCS and the UE can choose among an appropriate TFC for the uplink transmissions. Node B has no control on the UEs transmission time. There is also no restriction on the retransmission timing for the UE. Employing a retransmission protocol with synchronous retransmissions Node B exactly knows when the retransmissions are sent by UE, hence it can reserve uplink resources, which enables Node B a more precise control on the uplink interference in the cell.

In a time and rate controlled scheduling mode Node B schedules the initial—as well as the retransmissions sent on the E-DCH. In case retransmissions are sent in a synchronous manner, Node B doesn't need to schedule the retransmissions anymore, which reduces the signaling overhead and the processing time for the scheduler in Node B significantly. The retransmission is sent $T_{sync}$ after having received the NACK. UE doesn't have to monitor the grant channel for a scheduling assignment (SA) for the retransmission.

Due to transmitting retransmissions a fixed time period after receiving the NACK ($T_{sync}$), there are delay benefits on UE side. In case retransmissions are also scheduled, Node B could assign transmission resources to other UEs instead of scheduling the pending retransmissions.

In multi-access communication systems, techniques to reduce mutual interference between multiple users may be utilized, in order to increase the capacity. By means of for example power control techniques the transmission power of each user may be limited to a certain value that is necessary to achieve a desired quality of service. This approach may ensure that each user transmits only the power necessary, thereby making only the smallest possible contribution to the total noise seen by other users.

In this respect the interference caused by retransmissions may be an important issue. In order to improve the capacity and hence in order to increase the coverage and throughput of a communication system, it may be desirable to keep the uplink interference caused by retransmissions as small as possible. Especially in interference critical situations, where a lot of transmissions are most likely received in error, it may be desirable that the corresponding retransmissions do not increase the interference level in the cell significantly.

For example in a UMTS environment using a HARQ retransmission protocol with synchronous retransmissions, it may be desirable that the interference in the cell is not significantly increased due to a huge number of retransmissions, since a Node B may not have control on the retransmission timing.

Furthermore employing a HARQ retransmission scheme may increase the data transmission efficiency, i.e. throughput and system performance, in a mobile communication system. The power used for retransmissions may for example be reduced by using the information received from the previously erroneously data packet to decode the retransmitted data packet.

More specifically, the soft decisions from the previous corrupted data packet may be soft combined with the retransmitted data packet. Therefore the energy per bit (EbNt) required for a successful decoding of the data packet may be reduced for the retransmission.

However in a conventional HARQ scheme the transmitting entity upon receiving a retransmission request has no knowledge of the reception quality of the previously incorrectly received data packet and hence does not know what retransmission power level is required for a successful decoding after soft combining.

For example when utilizing a HARQ retransmission scheme with Incremental Redundancy (IR) the transmitting entity does not know how much additional information (redundancy) is required for a successful decoding. When the transmission power for the retransmission data packet is too low or the amount of redundancy is not sufficient, the decoding will most probably fail. Hence, the delay is increased due to further required retransmissions. On the other hand if the retransmission power is more than required for a successful decoding resources are wasted, which could have been allocated for other initial transmissions. US 2003/0235160 A1 describes an adaptive gain adjustment for the retransmission power of retransmission. The document proposes a retransmission protocol, where initial transmissions are transmitted at a first power level and retransmission data packets are transmitted with reduced power. Power control by means of the gain for retransmissions is adapted by adjusting the traffic-pilot ratio in order to optimise the performance. The adjustment of the traffic-pilot ratio is based on whether or not the previous retransmission data packet was successfully decoded by the base station.

SUMMARY OF THE INVENTION

According to one embodiment of the present invention, a method for controlling the amount of information in retransmission data packets transmitted from a transmitting entity to a receiving entity via at least one data channel using a hybrid automatic repeat request protocol and soft combining of received data is provided.

The method may comprise transmitting a data packet from the transmitting entity to the receiving entity and receiving a feedback message from the receiving entity at the transmitting entity, wherein the feedback message indicates whether the data packet has been successfully received by the receiving entity.

In case the feedback message indicates that the data packet has not been received successfully, a control message may be received at the transmitting entity for the unsuccessfully received data packet, wherein the control message restricts the amount of information to be sent in the retransmission data packet for the unsuccessfully received data packet.

Further, a retransmission data packet may be transmitted from the transmitting entity to the receiving entity comprising an amount of information indicated in the control message.

According to a further embodiment of the present invention the control message may indicate the maximum and minimum amount of information or a maximum amount of information in: the retransmission data packet. In a further embodiment, the information sent in the retransmission packet may comprise systematic and parity bits.

In another embodiment of the present invention the transmission of the restricted amount of information may require a reduced transmission power compared to the transmission power used for the data packet.

According to another embodiment, the control message may be transmitted in parallel or delayed to the feedback message from the receiving entity to the transmitting entity.

In a further embodiment, the feedback message may be transmitted via an acknowledgment channel and the control message may be transmitted via a scheduling related control channel.

Another embodiment of the present invention encompasses the use of synchronous retransmissions. Therefore, the retransmission data packet may be transmitted by the transmitting entity after a predetermined time span upon having received the feedback message.

Further, the control message may be used to indicate not to transmit the retransmission data packet after a predetermined time span upon having received the feedback message. I.e. according to this further embodiment of the present invention the provision of synchronous or asynchronous retransmissions may be controlled.

In another embodiment of the invention the control message may be a TFC control message. For example when using UMTS Rel99/4/5, the message may be a TFC control message, which lists the allowed transport format indicators (TFIs) for the restricted transport channel, the retransmission is transmitted on. In a further variation of this embodiment, the restricted TFCS may be only valid for the retransmission of the data packet, where after the TFCS reverts to the situation prior to the retransmission.

Further, in an alternative embodiment of the present invention the method may further comprise soft combining the retransmission data packet and the transmitted data packet at the receiving entity at the receiving entity to obtain a combined data packet.

According to another embodiment, this combined data packet may be decoded at the receiving entity.

Thus, it may be for example desirable that the transmitted control message indicates the retransmission data packet's amount of information necessary for successfully decoding of the combined data packet, which is a another aspect of the present invention.

In another embodiment, the method may further comprise determining the amount of information for the retransmission data packet at the receiving entity based on the reception quality of the data packet or the combined data packet.

A further embodiment encompasses the additional step of transmitting the data packet via a first data channel from the transmitting entity to the receiving entity. In this embodiment, the retransmission data packet may be transmitted via a second data channel from the transmitting entity to the receiving entity.

According to another embodiment of the present invention the transmission time interval of the first data channel is smaller than the transmission time interval of the second data channel.

In another embodiment of the present invention the transmitted data packet and the retransmission data packet are transmitted via at least one dedicated transport channel.

According to a further embodiment of the present invention, a receiving entity for receiving data packets from a transmitting entity via at least one data channel using a hybrid automatic repeat request protocol and soft combining of received data is provided. The receiving entity may comprise receiving unit for receiving a data packet from the transmitting entity and transmitting unit for transmitting a feedback message to the transmitting entity, wherein the feedback message indicates whether the data packet has been successfully received by the receiving entity.

The transmitting unit may be further adapted to transmit a control message to the transmitting entity for the unsuccessfully received data packet in case the feedback message indicates that the data packet has not been received successfully, wherein the control message restricts the amount of information to be sent in a retransmission data packet for the unsuccessfully transmitted data packet, and the receiving unit may be adapted to receive a retransmission data packet from the transmitting entity comprising an amount of information indicated in the control message.

In another embodiment of the present invention a receiving entity is provided which may be adapted to perform the above-outlined method.

For example, the receiving entity may be a base station.

A further embodiment of the present invention provides a transmitting entity for transmitting data packets to a receiving entity via at least one data channel using a hybrid automatic repeat request protocol and soft combining of received data. According to this embodiment, the transmitting entity may comprise transmitting unit for transmitting a data packet from the transmitting entity and receiving unit for receiving a feedback message from the receiving entity, wherein the feedback message indicates whether the data packet has been successfully received by the receiving entity.

The receiving unit may adapted to receive a control message at the transmitting entity for the unsuccessfully received data packet in case the feedback message indicates that the data packet has not been received successfully, wherein the control message restricts the amount of information in a retransmission data packet to be sent for the unsuccessfully received data packet, and the transmitting unit may adapted to transmit a retransmission data packet to the receiving entity comprising an amount of information indicated in the control message.

In another embodiment of the present invention a transmitting entity is provided which may be adapted to perform the above-outlined method.

In an exemplary embodiment, the transmitting entity is a mobile terminal.

Moreover, another embodiment of the present invention provides a mobile communication system comprising at least one receiving entity and at least one transmitting entity described above.

Another embodiment of the present invention relates to a computer-readable medium for storing instructions that, when executed on a processor, cause the processor to control the amount of information in retransmission data packets transmitted from a transmitting entity to a receiving entity via at least one data channel using a hybrid automatic repeat request protocol and soft combining of received data by receiving a data packet from the transmitting entity, and transmitting a feedback message to the transmitting entity, wherein the feedback message indicates whether the data packet has been successfully received by the receiving entity.

In case the feedback message indicates that the data packet has not been received successfully, the instructions may further cause the processor to control the amount of information in retransmission data packets by transmitting a control message to the transmitting entity for the unsuccessfully received data packet, wherein the control message restricts the amount of information to be sent in a retransmission data packet for the unsuccessfully transmitted data packet, and receiving a retransmission data packet from the transmitting entity comprising an amount of information indicated in said control message. A further embodiment of the present invention relates to a computer-readable medium for storing instructions that, when executed on a processor, cause the processor to control the amount of information in retransmission data packets transmitted from a transmitting entity to a receiving entity via at least one data channel using a hybrid automatic repeat request protocol and soft combining of received data by transmitting a data packet from the transmitting entity, and receiving a feedback message from the receiving entity, wherein the feedback message indicates whether the data packet has been successfully received by the receiving entity. In case the feedback message indicates that the data packet has not been received successfully, the instructions may further cause the processor to control the amount of information in retransmission data packets by receiving a control message to the transmitting entity for the unsuccessfully received data packet, wherein the control message restricts the amount of information in a retransmission data packet to be sent for the unsuccessfully received data packet, and transmitting a retransmission data packet to the receiving entity comprising an amount of information indicated in said control message. Moreover, in a further embodiment of the present invention, the processor may be caused to perform the above described embodiments related to a method using respective instructions stored on the storage medium.

BRIEF DESCRIPTION OF THE FIGURES

In the following the present invention is described in more detail in reference to the attached figures and drawings. Similar or corresponding details in the figures are marked with the same reference numerals.

DETAILED DESCRIPTION OF THE INVENTION

Figure 1:
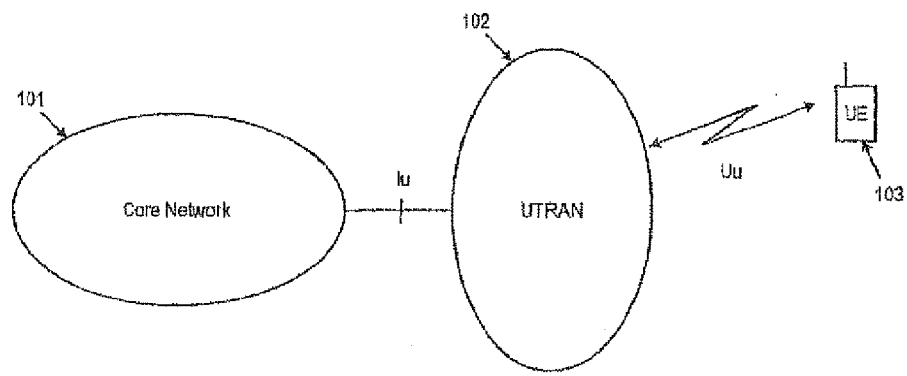
FIG. 1 shows the high-level architecture of UMTS.
Figure 2:
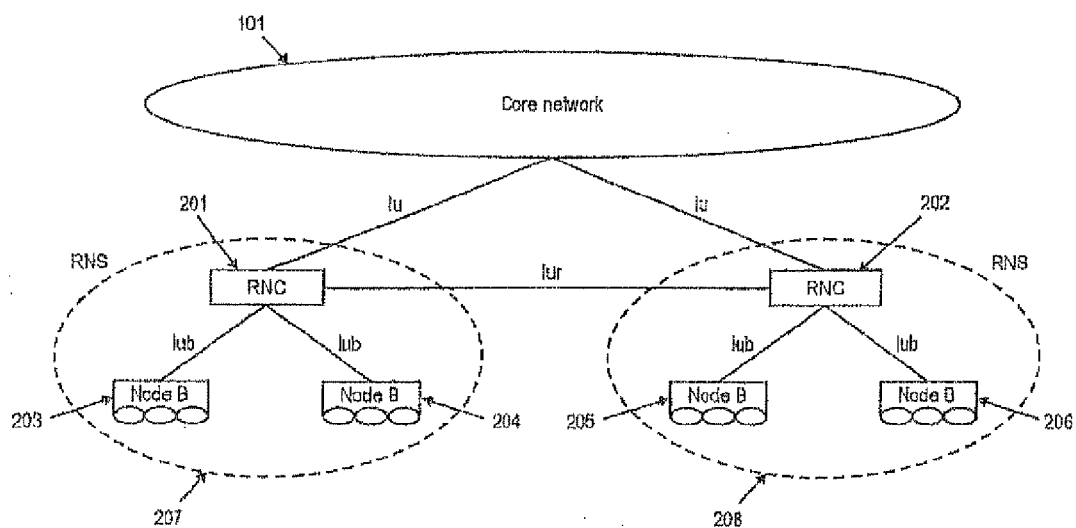
FIG. 2 shows the architecture of the UTRAN according to UMTS R99/415.
Figure 3:
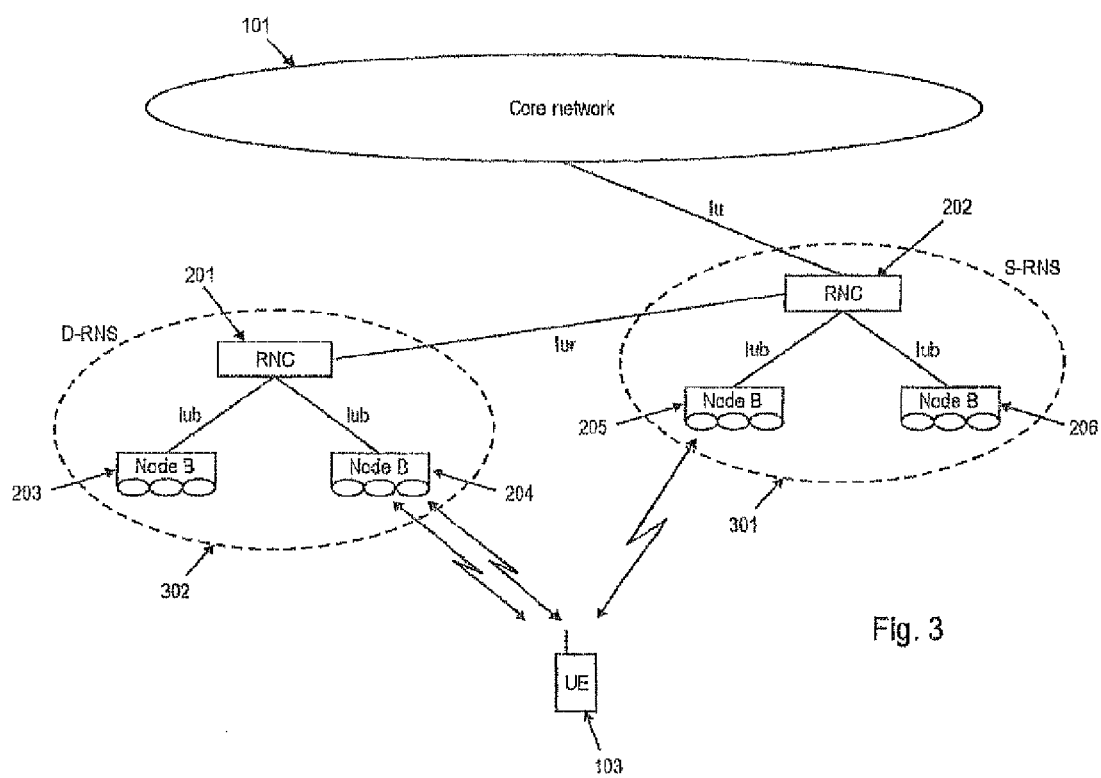
FIG. 3 shows a Drift and a Serving Radio Subsystem.
Figure 4:
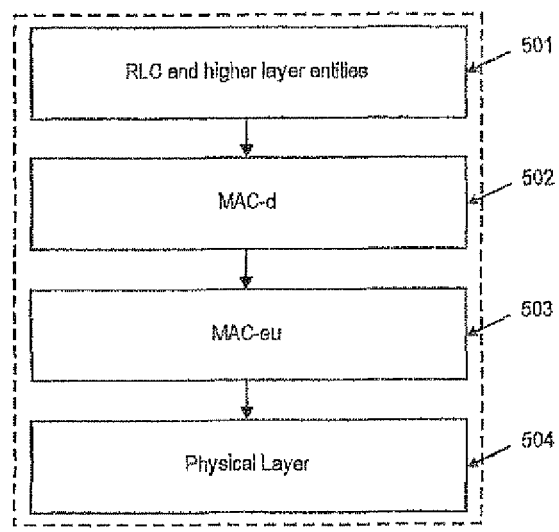
FIG. 4 shows the E-DCH MAC architecture at a user equipment.
Figure 5:
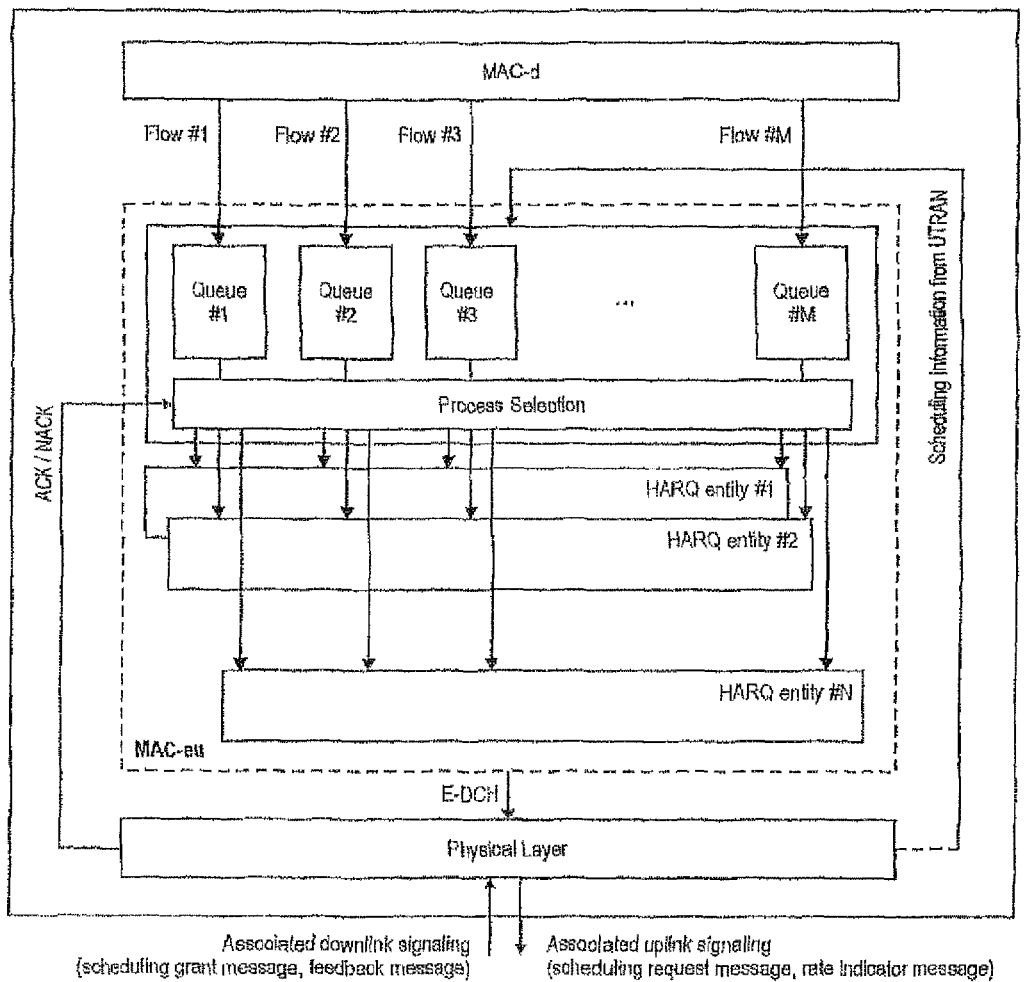
FIG. 5 shows the MAC-eu architecture at a user equipment.
Figure 6:
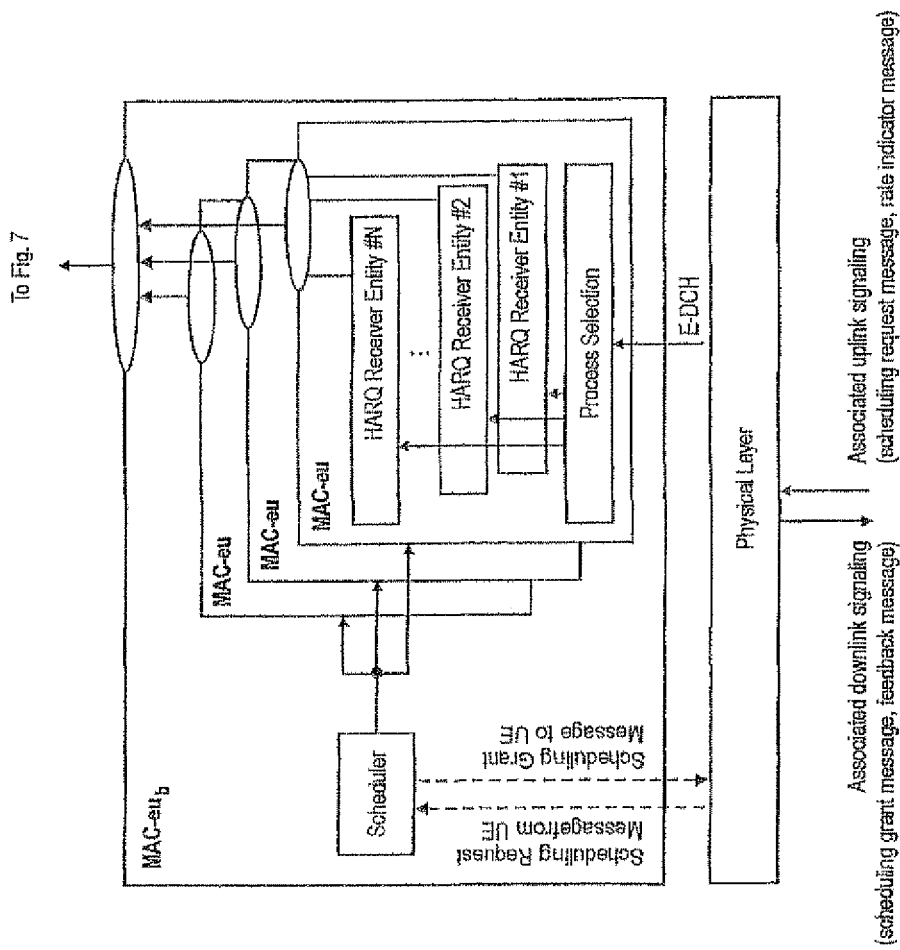
FIG. 6 shows the MAC-eu architecture at a Node B.
Figure 7:
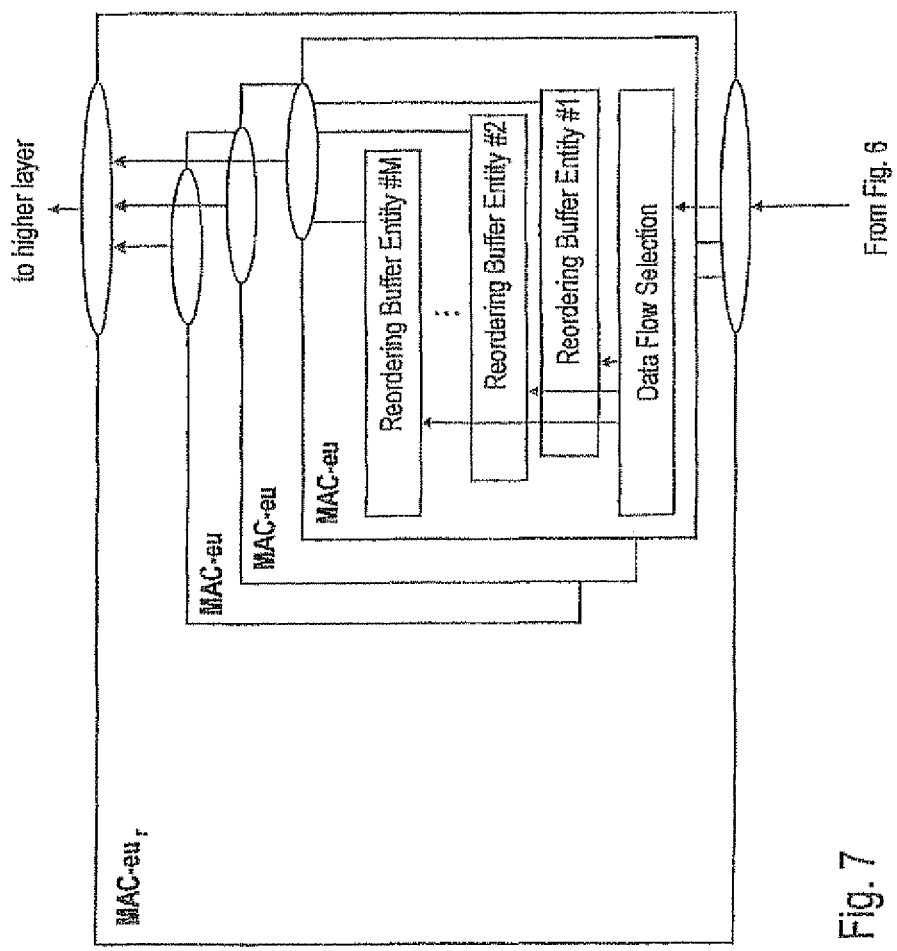
FIG. 7 shows the MAC-eu architecture at a RNC.
Figure 8:
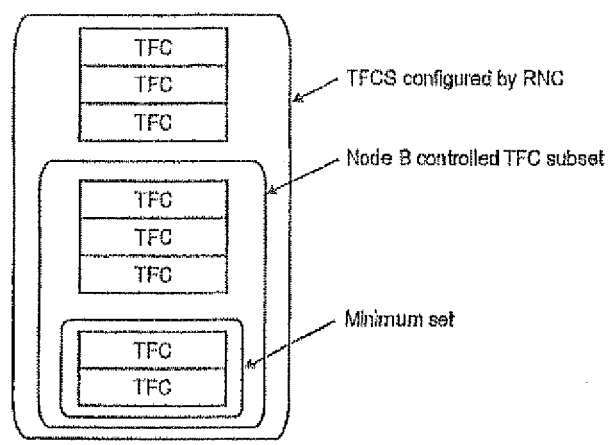
FIG. 8 shows transport format combination sets for Node B controlled scheduling.
Figure 9:
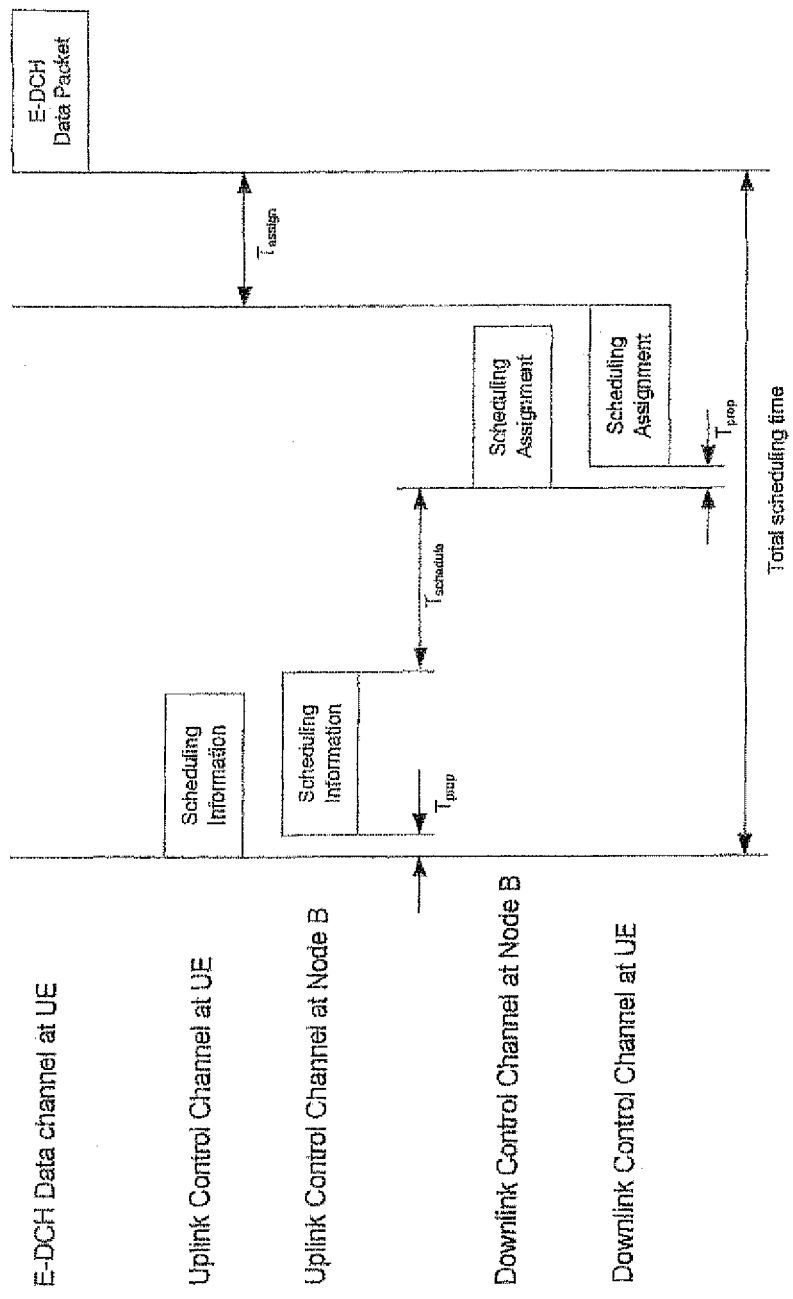
FIG. 9 shows the operation of a time and rate controlled scheduling mode.
Figure 10:
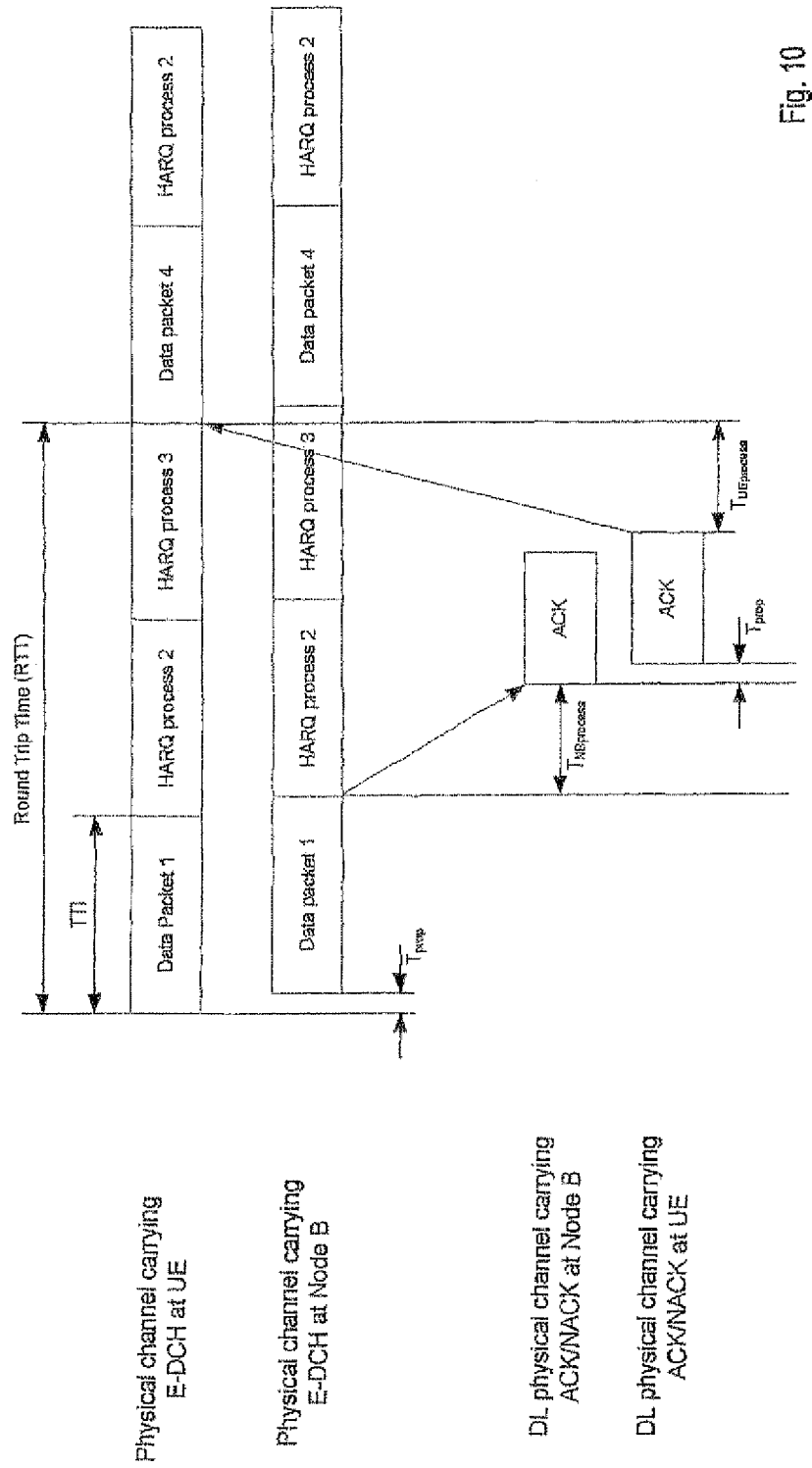
FIG. 10 shows a the operation of a 3-channel stop-and-wait HARQ protocol.

The following paragraphs will describe various embodiments of the present invention. For exemplary purposes only, most of the embodiments are outlined in relation to a UMTS communication system and the terminology used in the subsequent sections mainly relates to the UMTS terminology. However, the used terminology and the description of the embodiments with respect to an UMTS architecture is not intended to limit the principles and ideas of the present inventions to such systems. Generally, the principles of the present invention may be applicable to any kind of mobile communication systems, for example to communication systems based on the IMT-2000 framework.

As will become apparent one of the various aspects of the present invention relates to controlling the amount of information in retransmissions to a minimum level such that—e.g. after soft combining an initial transmission with at least one retransmission—decoding of the transmitted data becomes possible. As will be explained in greater detail below, controlling the amount of information in retransmissions may decrease the required transmission power for the retransmissions which may lead to a significant decrease of the interference on the air interface caused by retransmissions.

Within this document the term "information" may for example refer to systematic bits and parity bits of an error-correcting code (FEC) when using a HARQ protocol employing chase combining. If for example an incremental redundancy scheme is employed, the information may comprise parity bits only. It is noted that generally and depending on the employed retransmission protocol the data transmitted in the retransmissions may comprise redundancy only, systematic bits only or a combination thereof.

In an exemplary embodiment of the present invention it may be assumed that the initial transmission of a data packet is transmitted with a higher priority in terms of power than retransmissions. In case that initial transmissions do not meet the typical block error rates (BLER) and are transmitted with very little power only, then the retransmission transmit power may be higher than the transmit power of the initial transmissions.

However, uplink transmissions may be subject to fast power control, for example when considering the case of E-DCH. Due to the fast power control, the received SNR (signal to noise ratio) of a failed transmission may be only slightly smaller than the target SIR, which is required for a successful decoding.

Therefore if a retransmission for a data packet is transmitted with the same transmission power as the initial transmission of the data packet associated thereto—e.g. in the case of chase combining—the combined SNR after soft combining may exceed the required SNR significantly. So the transmit power for retransmissions may be reduced without reducing the probability of a successful decoding.

According to an embodiment of the present invention, a limitation of the uplink interference may be achieved for example by reducing the number of bits transmitted in the retransmission data packet. The information transmitted in the retransmission packet may comprise systematic as well as parity bits. In case a smaller amount of information than in the initial transmission is transmitted in the retransmissions, less power may be required to send the retransmissions. Consequently, less uplink interference may be caused.

However, when the number of bits (information), sent in the retransmission, is not sufficient for a successful decoding further retransmissions may be required, which may increase delay.

Considering the example of a UMTS communication system, one method to control the amount of information transmitted in the retransmissions may be controlling the transport format combination set (TFCS), from which UE can select a transport format combination (TFC) for the retransmission. A Node B may restrict the Transport formats (TFs) of the transport channel, the retransmissions are transmitted on, such that less information than in the initial transmission may be transmitted in the retransmission. This method may provide Node B with some control on the amount of information and, as a result, provides control on the uplink interference caused by the retransmissions. However, the decrease in the uplink interference may imply additional control signaling. Furthermore UE may monitor a scheduling related downlink control channel in order to receive the control message restricting the amount of information for the retransmissions.

The UE may either constantly monitor the scheduling related downlink control channel or alternatively, a negative feedback message may indicate to the UE that a control message should be received a predetermined time span after receiving the negative feedback message. The later option may enable the UE to save power in case there is no need to constantly monitor the scheduling related downlink control channel.

Figure 11:
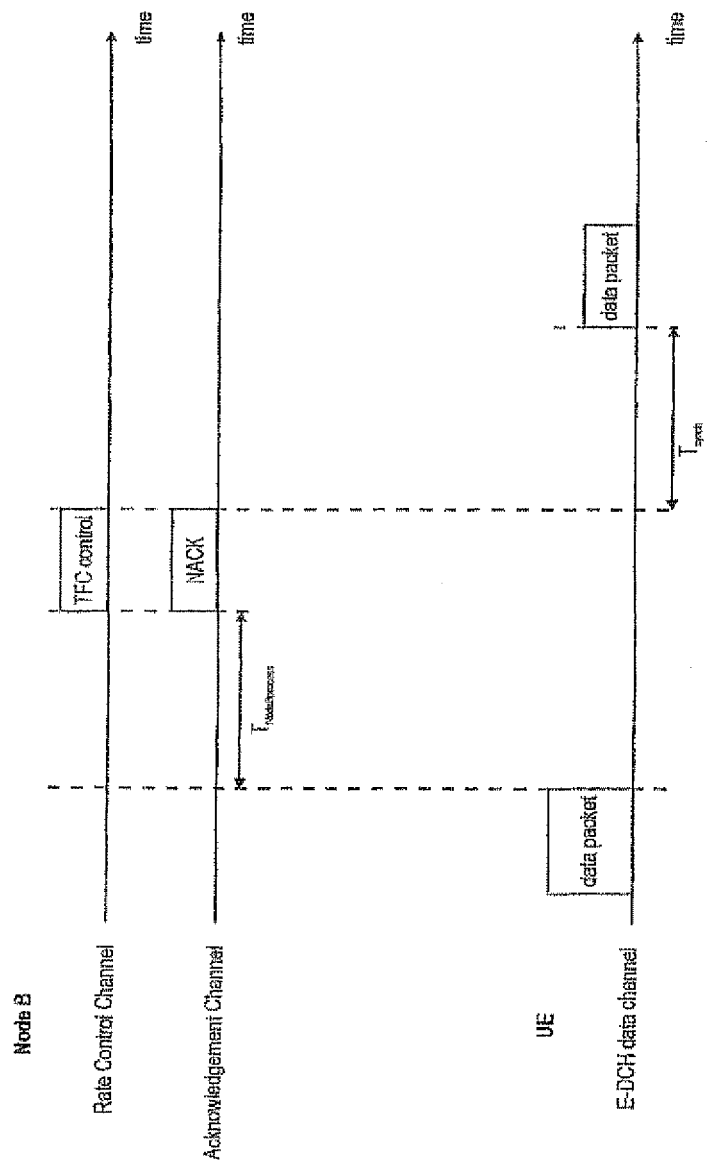
FIG. 11 shows a HARQ protocol with synchronous retransmissions and TFCS restriction by Node B for the retransmissions according to one embodiment of the present invention.

In FIG. 11 shows a HARQ protocol with synchronous retransmissions and TFCS restriction by Node B for the retransmissions according to one embodiment of the present invention. It should be noted that propagation delays of the different messages are not shown in the figure.

First the UE being the transmitting entity transmits a data packet to the receiving entity, for example a Node B. The data packet may be an initial transmission of data or a retransmission. If the decoding of a received data packet has failed, Node B may transmit a NACK to the corresponding UE. The decoding attempt of the data packet is illustrated by the processing time $T_{NodeBProcess}$. A TFC control message may be transmitted on a control channel. As outlined above the transmission of the TFC control message may either be simultaneously to the NACK or may be delayed.

This TFC control message may restrict the TFCS at the UE from which the UE may choose one transport format combination for the retransmission. The TFCS may for example be reduced by one step, e.g. using a Rate Down command, or by several steps, e.g. TFCS indicator.

For example upon elapse of a predetermined time period upon having received the NACK $T_{sync}$ the UE may retransmit a data packet, i.e. send a retransmission data packet to the Node B.

According to another embodiment of the present invention, Node B may also set the TFCS to zero in an extreme case. When using a synchronous retransmission mode, this may indicate to the UE not to transmit the retransmission at the synchronous timing.

Another embodiment of the present invention provides a variation of the previously described embodiments. According to this embodiment, Node B may set the TFCS according to the reception quality of the received data packets. For example, when using a HARQ protocol with incremental redundancy (IR), Node B may control the amount of redundancy in the retransmissions by TFCS restriction control.

If only little additional redundancy is required for a successful decoding after soft combining of the retransmission and previously stored transmissions, then Node B may restrict the TFCS of the UE. Node B may estimate the required additional redundancy for a successful decoding based on the reception quality of the already received transmissions of a data packet, i.e. the initial transmission and retransmissions that have been already transmitted for the data packet. The already received transmissions of a data packet may for example be soft combined, and the necessary redundancy may be determined based on the combined data.

The reception quality may be for example measured based on the soft decisions output (log likelihood ratios) of the decoder. The log likelihood ratio (LLR) of a bit is generally defined as the logarithm of the ratio of probabilities. Therefore it carries some information about the reliability of the bit decision. The sign of the LLR represents the bit decision (for example '−' equals 1 and '+' equals 0). The absolute value of a LLR may represent the reliability of the bit decision. If the bit decision for example is not very confident, the absolute value of the LLR is very small. Furthermore the reception quality may for example also be measured using a received signal strength value, a signal to interference ratio (SIR) or a combination of possible measurement parameters.

So far the embodiments outlined above discussed the ease that Node B or the receiving HARQ protocol entity restricts the maximum amount of information (bits) provided in the retransmission. In case the additional information transmitted in the retransmission is not sufficient for a successful decoding, further retransmissions may be required which may hence lead to an increased delay.

Therefore, according to another embodiment of the present invention, it may be useful if the receiving entity also signals to the transmitting entity the minimum amount of information, which may be transmitted in the retransmission. Hence, the transmitting entity may decide for example depending on the current transmission buffer status and the available transmit power, whether to transmit more than the indicated minimum amount of information or not. Depending on the accuracy of the estimation for the additional information required for a successful decoding, the HARQ protocol operation may be further optimized if the receiving entity (for example Node B) sets an upper as well as lower limit of the amount of information for the retransmissions.

A further approach for reducing the uplink interference may be to use a longer transmission time interval (TTI) length for the retransmissions. Initial transmissions may be for example sent in a 2 ms TTI and the retransmissions in a 10 ms TTI. Considering again for exemplary purposes only a UMTS communication system, one E-DCH may be configured with a 2 ms TTI length and may be used for the initial transmissions and another E-DCH with 10 ms TTI length may be used for the transmission of the retransmission data packets.

This may reduce interference caused by retransmissions, since the spreading factor may be increased if retransmissions are transmitted with a longer TTI. Hence less transmit power may be required due to a higher processing gain and thus interference may be controlled. Furthermore a longer TTI may provides more time diversity which may also allow for a further decrease of the transmit power of retransmission data packets.

If the transmission power for retransmissions may be reduced, the saved power may be allocated to other UEs (initial transmissions), which may increase the cell throughput in consequence.

Figure 12:
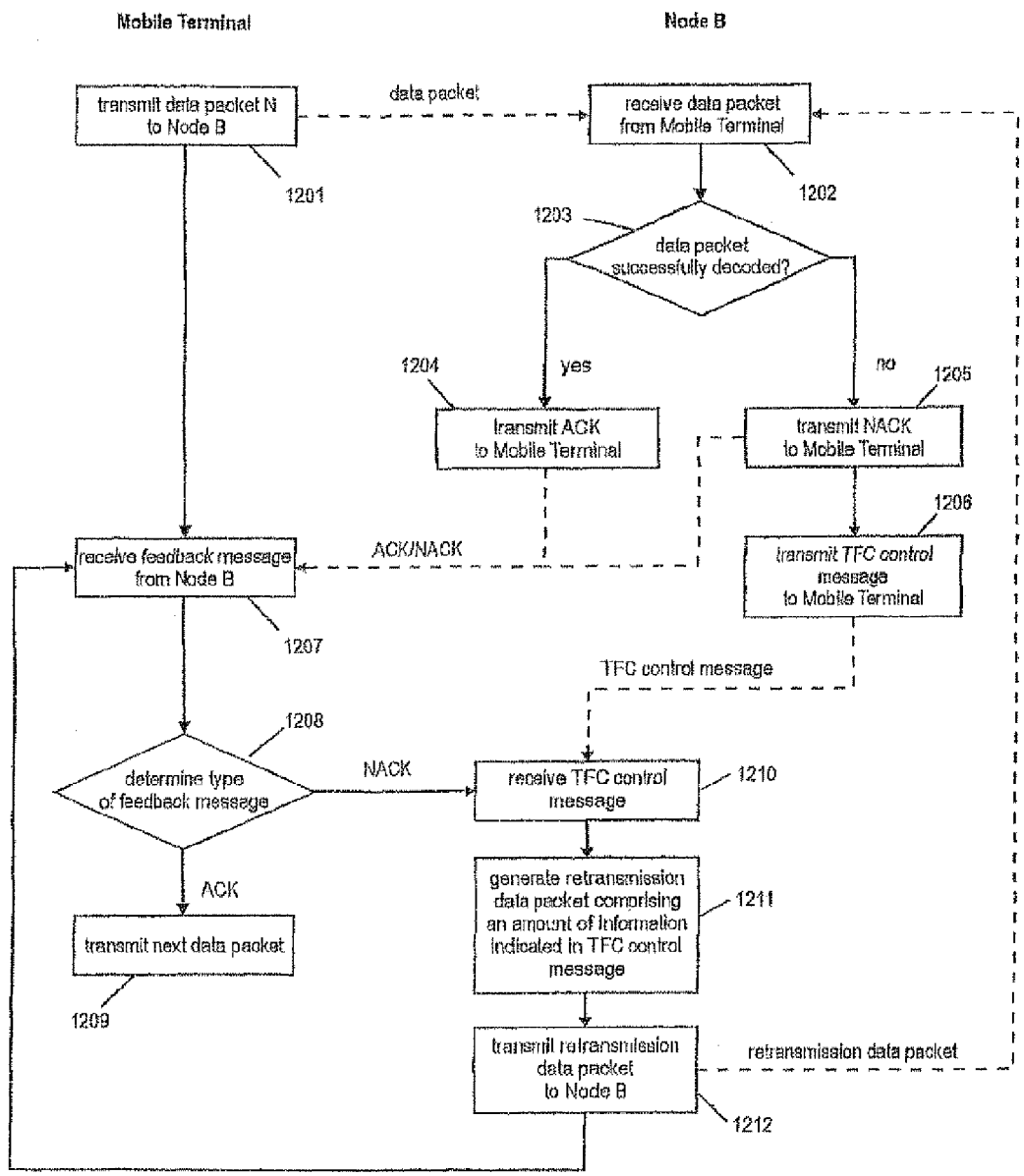
FIG. 12 shows a flow chart of the interference control method according to an exemplary embodiment of the present invention.

FIG. 12 shows a flow chart of the interference control method according to an exemplary embodiment of the present invention. According to this exemplary example, in a first step 1201, a transmitting entity, for example a UE, transmits a data packet or (retransmission data packet) to the receiving entity, for example a Node B. Upon receiving the data packet in step 1202, the receiving entity may determine whether the data packet has been successfully decoded or not in step 1203.

If the data packet has been successfully decoded, a positive feedback message, such as an ACK may be sent to the transmitting entity in step 1204. Otherwise, a negative feedback, such as a NACK, may be transmitted to the transmitting entity in step 1205. Essentially in parallel to the negative feedback or delayed thereto a further control message which may restrict the amount of information in a retransmission for the unsuccessfully received data packet may be provided to the transmitting entity in step 1206. When considering for exemplary purposes only a UMTS system, a TFC control message may be used to restrict the TFCS of a UE such that the retransmission will comprise a reduced amount of information.

In step 1208, the transmitting entity may receive the feedback from the receiving entity, and may next determine which type of feedback has been received for the data packet transmitted in step 1201. If a positive feedback has been received, the transmitting entity may proceed and send the next data packet waiting in the queue (see step 1209).

In case a negative feedback has been received in step 1207, the transmitting entity may receive the control message transmitted from the receiving entity in step 1210.

In an alternative variation of this embodiment, this message may be received via a scheduling related control channel, while the feedback may have been received via an acknowledgement channel.

Further, it should be noted that though FIG. 12 indicates a specific sequence of steps 1207, 1208 and 1210 the reception of the control message in step 1210 may also be performed in parallel to step 1207, i.e. before judging the type of feedback in step 1208. In the latter exemplary case, the scheduling related control channel via which the control message is transmitted may be constantly monitored. This may be for example because other control information may need to be obtained from this channel for data transmission and reception purposes, such as scheduling, rate control, etc.

Alternatively, as indicated in FIG. 12 the control message may also be transmitted delayed to the feedback message, to allow the transmitting entity to receive the feedback, to determine its type and to start monitoring the control channel for the control message transmitted from the receiving entity.

As outlined above, the information in the control message received in step 1210 may be used in step 1211 to form a retransmission data packet, comprising an amount of information as indicated in the control message. Upon forming the retransmission data packet same may be transmitted to the receiving entity in step 1212.

Further, feedback for the retransmitted data packet is provided in a similar manner as described above with reference to blocks 1202 to 1207. In step 1203, the initially transmitted data packet may be soft combined with the retransmissions prior to decoding.

The embodiments of the present invention described with reference to FIG. 12 may be understood as a new improved 1-channel. SAW HARQ protocol. The skilled person will recognize that it may also be possible to use the method shown in FIG. 12 in a N-channel HARQ protocol, wherein N processes as shown in FIG. 12 are performed in parallel. Moreover, another embodiment of the present invention relates to the implementation of the above described various embodiments using hardware and software. It is recognized that the various above mentioned methods as well as the various logical blocks, modules, circuits described above may be implemented or performed using computing devices, as for example general purpose processors, digital signal processors (DSP), application specific integrated circuits (ASIC), field programmable gate arrays (FPGA) or other programmable logic devices, etc. The various embodiments of the present invention may also be performed or embodied by a combination of these devices.

Further, the various embodiments of the present invention may also be implemented by means of software modules which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:
1. A method comprising the following steps performed by a user equipment:
transmitting an uplink data packet to a base station based on a synchronous hybrid automatic repeat request (HARQ) protocol,
receiving a first information element and a second information element in parallel from the base station, wherein the first information element is an ACK/NACK message and the second information element indicates a modulation and coding scheme (MCS) for a retransmission, and
transmitting the retransmission to the base station according to the modulation and coding scheme.
2. The method according to claim 1, wherein the first information element indicates whether to perform the retransmission of the uplink data packet.
3. A user equipment comprising:
a transmitter section that transmits an uplink data packet to a base station on a synchronous hybrid automatic repeat request (HARQ) protocol, and
a receiver section that receives a first information element and a second in-formation element in parallel from a base station, wherein the first information element is an ACK/NACK message, and the second information element indi-cates a modulation and coding scheme (MCS) for a retransmission,
wherein the transmitter section transmits the retransmission to the base station according to the modulation and coding scheme.

4. The user equipment according to the claim 3, wherein the first information element indicates whether to perform the retransmission of the uplink data packet.

\* \* \* \* \*